United States Patent
Ch'ng et al.

(10) Patent No.: US 8,060,058 B2
(45) Date of Patent: Nov. 15, 2011

(54) SECURE MOBILE BASE STATION CONNECTIONS

(75) Inventors: Shi Baw Ch'ng, North Billerica, MA (US); Minsh Den, Nashua, NH (US); Woojune Kim, Arlington, MA (US); Douglas Norman Knisely, Wheaton, IL (US); Robin Montague Mathews, Chelmsford, MA (US)

(73) Assignee: Airvana, Corp., Chelmsford, MA (US)

( * ) Notice: Subject to any disclaimer, the term of this patent is extended or adjusted under 35 U.S.C. 154(b) by 875 days.

(21) Appl. No.: 11/966,195

(22) Filed: Dec. 28, 2007

(65) Prior Publication Data

US 2009/0170475 A1 Jul. 2, 2009

(51) Int. Cl.
H04M 1/66 (2006.01)

(52) U.S. Cl. ...... 455/411; 370/338; 370/331; 455/432.1

(58) Field of Classification Search .................. None
See application file for complete search history.

(56) References Cited

U.S. PATENT DOCUMENTS

| | | |
|---|---|---|
| 6,711,144 B1 | 3/2004 | Kim et al. |
| 6,731,618 B1 | 5/2004 | Chung et al. |
| 6,741,862 B2 | 5/2004 | Chung et al. |
| 6,781,999 B2 | 8/2004 | Eyuboglu et al. |
| 7,170,871 B2 | 1/2007 | Eyuboglu et al. |
| 7,200,391 B2 | 4/2007 | Chung et al. |
| 7,242,958 B2 | 7/2007 | Chung et al. |
| 7,277,446 B1 | 10/2007 | Abi-Nassif et al. |
| 7,299,278 B2 | 11/2007 | Ch'ng |
| 7,558,356 B2 | 7/2009 | Pollman et al. |
| 7,558,588 B2 | 7/2009 | To et al. |
| 7,603,127 B2 | 10/2009 | Chung et al. |
| 2002/0196749 A1 | 12/2002 | Eyuboglu et al. |
| 2003/0100311 A1 | 5/2003 | Chung et al. |
| 2005/0213555 A1 | 9/2005 | Eyuboglu et al. |
| 2005/0243749 A1 | 11/2005 | Mehrabanzad et al. |
| 2005/0245279 A1 | 11/2005 | Mehrabanzad et al. |
| 2006/0067422 A1 | 3/2006 | Chung |
| 2006/0067451 A1 | 3/2006 | Pollman et al. |
| 2006/0126509 A1 | 6/2006 | Abi-Nassif |
| 2006/0159045 A1 | 7/2006 | Ananthaiyer et al. |
| 2006/0240782 A1 | 10/2006 | Pollman et al. |
| 2006/0291420 A1 | 12/2006 | Ng |
| 2006/0294241 A1 | 12/2006 | Cherian et al. |
| 2007/0026884 A1 | 2/2007 | Rao |
| 2007/0058628 A1 | 3/2007 | Palnati et al. |
| 2007/0077948 A1 | 4/2007 | Sharma et al. |
| 2007/0097916 A1 | 5/2007 | Eyuboglu et al. |

(Continued)

FOREIGN PATENT DOCUMENTS

GB 2452688 3/2009

OTHER PUBLICATIONS

3rd Generation Partnership Project 2 "3GPP2", "cdma2000 High Rate Packet Data Interface Specification", C.S0024, version 2, Oct. 27, 2000 (441 pages).

(Continued)

Primary Examiner — Phuoc Doan
(74) Attorney, Agent, or Firm — Fish & Richardson P.C.

(57) ABSTRACT

In addition to other aspects disclosed, through a non-secure network, one or more bidirectional secure logical connections are established between a mobile base station and a secure network interface.

17 Claims, 6 Drawing Sheets

U.S. PATENT DOCUMENTS

| | | |
|---|---|---|
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0147320 A1* | 6/2007 | Sattari et al. .................. 370/338 |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Sharma et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0116445 A1 | 5/2009 | Samar et al. |
| 2009/0154447 A1 | 6/2009 | Humblet |
| 2009/0156165 A1 | 6/2009 | Raghothaman et al. |
| 2009/0156195 A1 | 6/2009 | Humblet |
| 2009/0156218 A1 | 6/2009 | Garg et al. |
| 2009/0163202 A1 | 6/2009 | Humblet et al. |
| 2009/0163216 A1 | 6/2009 | Hoang et al. |
| 2009/0163238 A1 | 6/2009 | Rao et al. |
| 2009/0164547 A1 | 6/2009 | Ch'ng et al. |
| 2009/0168766 A1 | 7/2009 | Eyuboglu et al. |
| 2009/0168788 A1 | 7/2009 | Den et al. |
| 2009/0170440 A1 | 7/2009 | Eyuboglu et al. |
| 2009/0170475 A1 | 7/2009 | Ch'Ng et al. |
| 2009/0170520 A1 | 7/2009 | Jones |
| 2009/0170547 A1 | 7/2009 | Raghothaman et al. |
| 2009/0172169 A1 | 7/2009 | Ch'Ng et al. |
| 2009/0172397 A1 | 7/2009 | Kim |
| 2009/0186626 A1 | 7/2009 | Raghothaman et al. |
| 2009/0262697 A1 | 10/2009 | To et al. |

OTHER PUBLICATIONS

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

3rd Generation Partnership Project 2 "3GPP2", "cdma2000 High Rate Packet Data Interface Specification", C.S0024-A, version 1, Mar. 2004 (1083 pages).

Network Working Group, "UDP Encapsulation of IPsec ESP Packets", RFC 3948, Jan. 2005 (15 pages).

* cited by examiner

SECURE MOBILE BASE STATION CONNECTIONS

BACKGROUND

This description relates to establishing, in cellular wireless communication systems, secure connections through non-secure networks.

A cellular wireless communication system may serve a large geographic area, within which multiple transceiver stations may be deployed to serve access terminals and define zones of coverage (known as cells). As such, a large geographic area may be divided into many cells and each cell may be further divided into sectors.

Various types of access terminals such as cellular telephones, laptop computers, personal digital assistants (PDA's), etc. may be used to access cellular wireless communication systems. Often an access terminal establishes a direct connection with the communication system, which may be considered a secure connection. Some access terminals such as computer systems and laptop computers may establish indirect connections with cellular wireless communication systems through networks such as the Internet, which may not be considered secure.

SUMMARY

In general, in some aspects of the disclosure, a method includes establishing, through a non-secure network, one or more bidirectional secure logical connections between a mobile base station and a secure network interface. One or more of the bidirectional secure logical connections may be established based on user profile parameters. One or more of the bidirectional secure logical connections may be capable of transferring one or more types of content. One or more of the bidirectional secure logical connections may be assigned a priority and may be assigned to a mobile handset connected to the mobile base station. Similarly, one or more of the bidirectional secure logical connections may be assigned to two or more mobile handsets connected to the mobile base station. One or more of the bidirectional secure logical connections may be grouped with another bidirectional secure logical connection based on user profile parameters. Furthermore, the group of bidirectional secure logical connections may be assigned a priority. One of the bidirectional secure logical connections may be assigned one priority and another bidirectional secure logical connection may be assigned another priority, different from the first priority. One or more of the bidirectional secure logical connections may be established using IPSec protocol.

In some aspects of the disclosure, an apparatus is disclosed that includes a mobile base station capable of establishing, through a non-secure network, one or more bidirectional secure logical connections with a secure network interface. The apparatus may also include a tunnel manager capable of initiating, terminating and managing one or more bidirectional secure logical connections, dynamically or statically. The apparatus may also include a user profile registry in which user profiles containing user profile parameters of each user are stored and from which the user profiles may be retrieved by the tunnel manager. The tunnel manager may assign one or more bidirectional secure logical connections to one or more mobile handsets connected to the mobile base station. One bidirectional secure logical connection may be assigned one priority and another bidirectional secure logical connection may be assigned another priority, different from the first priority.

In some aspects of the disclosure, a system includes a secure network that includes a secure network interface and one or more mobile base stations capable of establishing, through a non-secure network, one or more bidirectional secure logical connections with the secure network interface. The system may also include one or more mobile handsets in communication with one or more of the mobile base stations. One or more of the mobile base stations may include a tunnel manager capable of initiating, terminating and managing one or more bidirectional secure logical connection. One or more of the mobile base stations may also maintain a user profile registry in which user profiles containing user profile parameters of each user are stored and from which the tunnel manager retrieves the user profile of a user to determine the properties of the at least one bidirectional secure logical connection to be established for that user. One bidirectional secure logical connection may be assigned one priority and another bidirectional secure logical connection may be assigned another priority, different from the first priority.

In some aspects of the disclosure, a computer readable medium stores instructions that are executable by a processing device. Upon such execution the processing device is caused to establish one or more bidirectional secure logical connections between a mobile base station and a secure network interface via a non-secure network. The establishment of the one or more bidirectional secure logical connections may be based on user profile parameters. One bidirectional secure logical connection may be grouped with another bidirectional secure logical connection based on user profile parameters. One bidirectional secure logical connection may be assigned one priority and another bidirectional secure logical connection may be assigned another priority, different from the first priority.

Other features and advantages will be apparent from the description and the claims.

DETAILED DESCRIPTION

Figure 1:
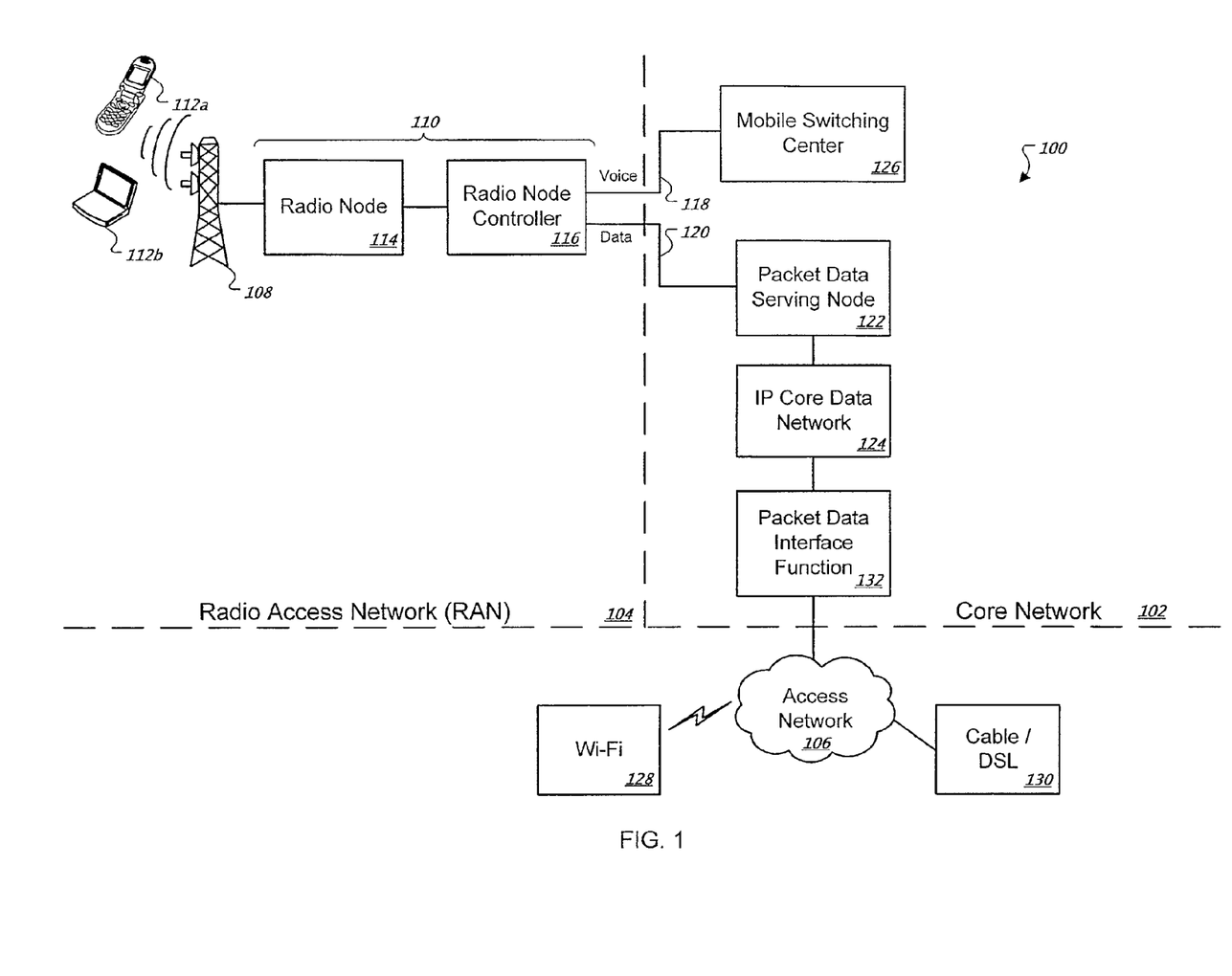
FIG. 1 is a block diagram of a wireless communication network.

Referring to FIG. 1, a network environment 100 is shown that includes a core network 102 that may be accessed by a radio access network (RAN) 104 and an access network 106. While communications between the core network 102 and the RAN 104 may be considered secure and trusted, in this implementation, communications through the access network 106 may be unreliable and non-secure. Typically, security and access of the RAN 104 and core network 102 are provided by a service provider. However, networks such as the access network 106 are left unrestricted by the service providers. Devices such as gateway interfaces and the like may be implemented to allow information exchange between the RAN 104 and the core network 102 while also providing network security for users connecting to the core network (e.g., via wired and wireless communications). The access network 106 may include a local area network (LAN), a wide area network (WAN) and other types of networking techniques.

The core network 102 provides access to services, such as switching telephone calls and routing data and control messages between sources and destinations. The core network 102 may subscribe to and comply with one or more types of protocols (e.g., internet protocol (IP), etc.) and communication standards. In some examples, the core network 102 is an IP Multimedia Subsystem (IMS) core network. In some examples, other types of secure networks may be implemented. The core network 102 may also provide a gateway to other networks. For example, the RAN 104 may communicate with the access network 106 or the plain old telephone service (POTS) network (not shown) via the core network 102.

In this illustration, access to the core network 102 through the RAN 104 is provided via a conventional antenna tower 108 that is erected at a fixed location and transmits and receives electromagnetic signals that are provided to and from a fixed location base station 110. One or more signaling techniques and standards may be implemented by the fixed location base station 110 to establish communication links (via the antenna tower 108) with one or more mobile handsets 112 such as a cellular telephone 112a and a laptop computer 112b. Mobile handsets may include devices capable of sending and receiving voice, video, data or other types of content using one or more communication protocols compatible with the RAN 104. For example, some types of mobile handsets include cellular telephones, laptop computers capable of wireless communications, personal data assistants (PDA), satellite telephones, global positioning system (GPS) devices, and vehicle navigation systems. Techniques and standards associated with the Universal Mobile Telecommunications System (UMTS) may be implemented such that multiple mobile handsets (often referred to as user equipment (UE) for this standard) may establish communication links and access the fixed location base station 110. Standards associated with spread spectrum air interface protocols such as code division multiple access (CDMA), wideband CDMA (WCDMA), etc. may also be implemented for accessing multiple mobile handsets (often referred to as access terminals for this family of standards). Other protocols supported may include the 1xEV-DO protocol, which is an EVolution of the 1xRTT standard for high-speed data-only (DO) services. and has been standardized by the Telecommunication Industry Association (TIA) as TIA/EIA/IS-856, "CDMA2000 High Rate Packet Data Air Interface Specification", 3GPP2 C.S0024-0, Version 4.0, Oct. 25, 2002, which is incorporated herein by reference. Revision A to this specification has been published as TIA/EIA/IS-856, "CDMA2000 High Rate Packet Data Air Interface Specification", 3GPP2 C.S0024-A, Version 2.0, June 2005, which is also incorporated herein by reference. Revision B to this specification has been initiated as TIA/EIA/IS-856, "CDMA2000 High Rate Packet Data Air Interface Specification," 3GPP2 C.S0024-B, Version 1.0, March 2006 and is also incorporated herein by reference.

To identify itself, the fixed location base station 110 transmits a signal (via the antenna 108) that incorporates one or more spread spectrum techniques, such as modulating the signal with a unique pseudorandom code. Thereby, the identification signal may appear as noise to an unintended receiver. But the identification information may be extracted with a process (e.g., a correlation process) by the intended receiver. By implementing such spread spectrum techniques or orthogonal coding techniques, a mobile handset 112 may distinguish base station identities and the probability of identification signal interference may be reduced. Other types of orthogonal or non-orthogonal coding techniques may also be used to produce unique transmission signals. For example, one or more pseudorandom number (PN) sequences (e.g., gold sequences) referred to as scrambling codes (e.g., for W-CDMA) may be implemented. One or more types of information may also be transmitted to uniquely identify the base station 110. For example data uniquely assigned to the base station 110 may be transmitted.

To provide an identification signal (along with transmitting and receiving other signals), the fixed location base station 110 includes a radio node (RN) 114 that may support one or more wireless standard and protocol (e.g., CDMA, W-CDMA, UMTS, etc.) for communicating with the mobile handsets. Typically the RN 114 includes a transceiver for receiving and transmitting electromagnetic signals. The RN 114 may also include one or more components (e.g., a modulator/demodulator (MODEM)) for modulating a transmission carrier signal to encode digital information for transmission, or demodulating a received analog signal to decode transmitted digital information. The fixed location base station 110 may also include a radio node controller (RNC) 116 that provides commands (and transmission signals) to the RN 114 and receives incoming signals from the RN 114.

Mobile handsets such as the mobile handset 112 may be capable of communicating both voice and data information. In this implementation, the base station 110 communicates with the core network 102 over a voice packet path 118 and a data packet path 120. Voice packets (received through the path 118) are provided to a mobile switching center (MSC) 126 that may coordinate mobility management for active voice calls of the mobile handset 112. The MSC 126 may also enable the mobile handset 112 to establish communication links with other devices and systems (e.g., a Plain Old Telephone System (POTS)) to engage in voice calls. The core network 102 also includes a packet data serving node (PDSN) 122 that communicates with the RNC 116 and may be implemented as a data server to direct data packets to appropriate delivery locations within the core network 102. The PDSN 122 may provide functionalities such as providing billing information, monitoring quality of service, and providing security for connections between the RAN 104 and the core network 102.

In this arrangement, the secure core network 102 may be accessed by non-secure communications through the access network 106. For example, the access network 106 may be in communication with a non-secure Wi-Fi access point 128 and a cable or digital subscriber line (DSL) access point 130. Devices connecting to either access point 128 or 130 may be capable of entering into a non-secure communication link with the access network 106. For example, the access network 106 may have no built-in means of authenticating and protecting against traffic allowed into the core network 102. However, security may be provided by a gateway between the access network 106 and the core network 102 to protect the core network 102 against malicious traffic.

The Wi-Fi access point 128 may connect wireless devices to the access network 106 such as cellular telephones with Wi-Fi capability, laptop computers, notepad computers, personal data assistants (PDA), digital cameras, DVD players, and other communications devices and electronic equipment. Various service providers can enable the wireless devices to connect to the access network 106. Each service provider can use different styles and degrees of security measures.

The cable and digital subscriber line (DSL) access point 130 may connect wired devices to the access network 106. The wired devices can include, for example, laptop computers, desktop computers, televisions, and DVD players. The wired devices can also include DSL and cable modems connected to various wired and/or wireless devices. A cable service provider or POTS provider can provide services to the access network 106 through the cable/DSL access point 130. Security may be controlled by these service providers, typically using equipment provided by the service providers.

Traffic from the Wi-Fi access point 128 and the cable/DSL access point 130 is received into the core network 102 by a packet data interface function (PDIF) 132. The PDIF 132, similar to the PDSN 122, may direct traffic to appropriate delivery locations within the core network 102. In some implementations, the PDIF 132 may provide billing, quality of service, and security mechanisms for connecting traffic from the access network 106 to the core network 102.

More or fewer components may be included in the network environment 100. In some implementations, multiple antenna towers, base stations, and mobile switching centers and the like may be located within the network environment 100. In some implementations, a GPRS Gateway Support Node (GGSN) in combination with or functioning as the PDSN 122 may provide a connection between the RAN 104 and the core network 102 for UMTS and GSM devices. Similarly, in some implementations, a packet data function (PDF) may be used in combination with the PDIF 132 or independently to connect the access network 106 to the core network 102.

Figure 2:
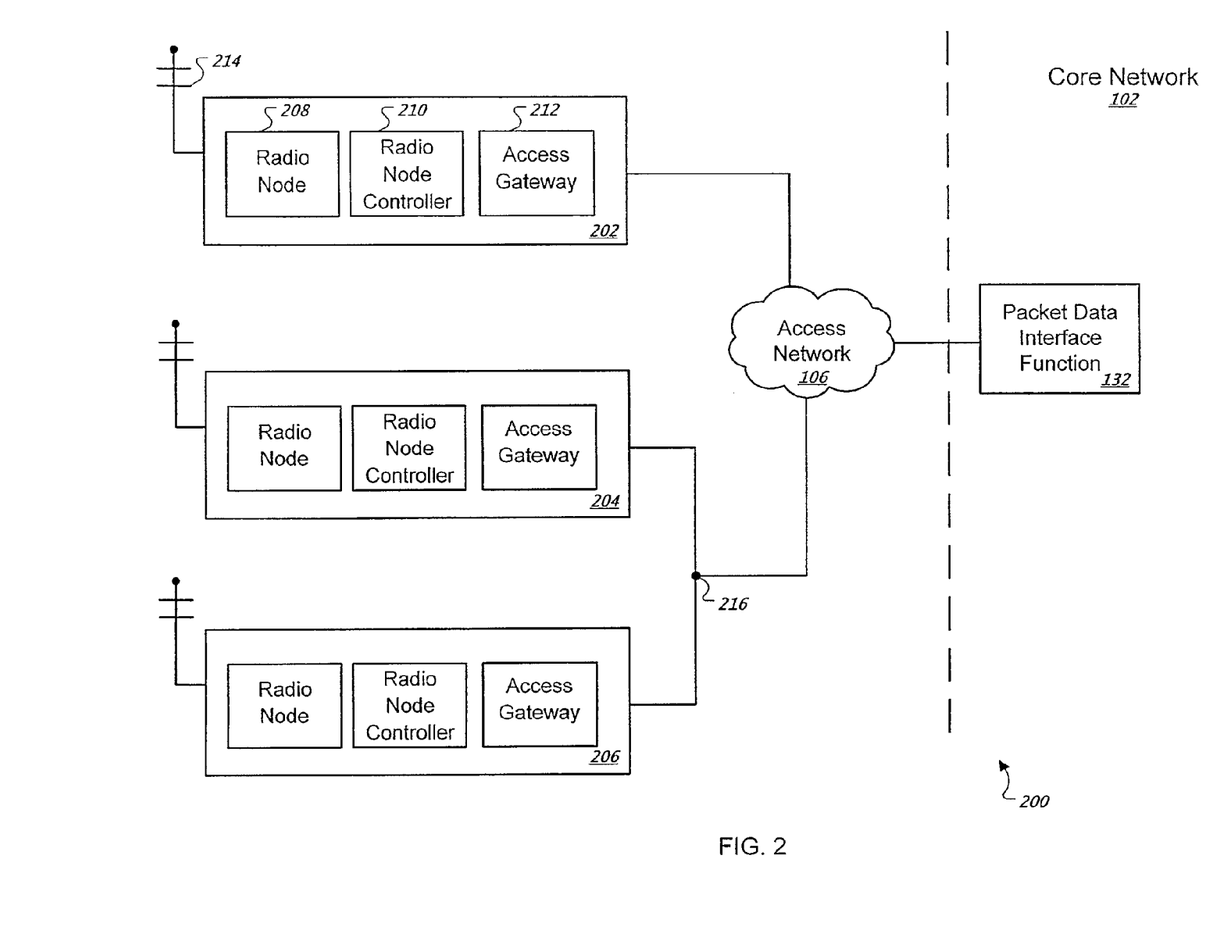
FIG. 2 is a block diagram of mobile base stations in communication with a trusted network.

Referring to FIG. 2, three mobile base stations 202, 204, and 206 are in secure communication with the core network 102 via the non-secure access network 106, and thereby form a trusted network environment 200. The PDIF 132 may provide protection to the core network 102 from non-secure traffic coming from the access network 106 and devices connected to the access network. Traffic received by the core network 102 from the access network 106 may be authenticated and securely encapsulated by the PDIF 132 before being transferred to one or more destinations. In some implementations, the access network 106 and connected devices (e.g. mobile base stations 202, 204, 206) may establish a secure communication link with the PDIF 132 before transmitting data and other types of content within the core network 102.

Each of the mobile base stations 202, 204, 206 provides functions similar to the fixed location base station 110 (shown in FIG. 1) along with being portable. For example, the mobile base station 202 may include an RN 208, an RNC 210 and an access gateway 212 (e.g., a PDSN). The mobile base station 202 is connected to a portable antenna 214 capable of establishing communication links with one or more mobile handsets. The characteristics of the portable antenna 214 (e.g., beam pattern, gain, etc.) may be selected for establishing links to mobile handsets located relatively close to the mobile base station 202. Furthermore, the design characteristics (e.g., component size, power consumption, etc.) of the RN 208, the RNC 210, and the access gateway 212 may be selected for portability. As such, the mobile base station 202 may provide less wireless coverage area than the fixed location base station 110 (e.g., coverage to service a single residential home, a portion of a multiple residence building or other structure or location of similar size and area). However, due to its mobility, the mobile base station 202 may interfere with the operations of the fixed location base station 110 or other relatively closely located base stations (e.g., other mobile base stations, fixed location base stations). For example, identification signals transmitted by the mobile base station 202 that use nearly equivalent allocations of a code space (e.g., PN offset, PN sequence, etc.) may interfere with the identification signals transmitted by other base stations.

In this arrangement, the mobile base stations 202, 204, 206 are connected to the access network 106 by access gateways (e.g., access gateway 212) respectively included in each mobile base station. For example, the access gateway 212 may translate one or more RAN communication protocols to 3GPP2 protocol for communicating with the access network 106. By translating RAN communications protocols, the mobile base station 202 may provide RAN-based mobile handsets with network access, for example, in geographic locations where there may be a lack of RAN connection availability. Along with providing similar functionality, the mobile base stations 202, 204, 206 may communicate with mobile devices using one or more networking protocols that are compatible with the access network 106. For example, the mobile base stations 202, 204, 206 may provide a connection point for Session Initiation Protocol (SIP) telephones, Bluetooth devices, etc. Through the connection to the core network 102, mobile devices in communication with the mobile base stations 202, 204, 206 may be capable of communication with other devices active within the core network 102, the RAN 104, a POTS (not shown) and similar networks.

Along with direct connections, indirect connections may be used by the mobile base stations to communicate with the access network 106. For example, the mobile base stations 204, 206 are connected to the access network 106 through an access point 216. In some examples, the access point 216 may be a network router, a virtual private network (VPN) gateway, networking switch or hub, or similar types of connection device. For example, by using a VPN gateway, the mobile base stations 204, 206 may provide network address translation (NAT) traversal capabilities to allow for IP address re-use within the local VPN. In other examples, the access point 216 may be a cable or DSL modem or another wired or wireless device that communicates with the access network 106.

Along with sending and receiving content (e.g., data packets, voice packets, etc.) to and from the mobile base stations 202, 204, 206 and the core network 102, the access network 106 may exchange data and signals with other components. For example, data may be sent to other base stations, servers, access points, networks, communications devices (e.g., computer, PDA, phone, television, etc.) or other similar delivery sites and sources. Similar to the base stations 202, 204, 206, data received by the access network 106 from such devices and sources may enter through the PDIF 132.

Along with transferring traffic (e.g., voice packets, data packets, etc.) to and from one or more mobile devices connected to the mobile base stations 202, 204, 206, the PDIF 132 may provide authentication information from the mobile base stations 202, 204, 206 through the core network 102 to the service provider of the mobile device(s) (e.g., a service provider within the RAN 104) for authentication and/or billing purposes. For example, in a 3GPP2 network, the PDIF 132 may forward IP routing, IP quality of service (IP QoS), and IP packet data billing from the mobile base stations 202, 204, 206 on behalf of the mobile devices communicating in compliance with the CDMA EV-DO protocol. In another example, the PDIF 132 may forward IP routing termination, IP QoS, and IP packet data billing for mobile devices which are communicating in compliance with the 1xRTT protocol.

In some implementations, the mobile base stations 202, 204, 206 may produce one or more secure logical connections (e.g., logical data tunnels) with the PDIF 132 for traffic. Separate secure logical connections may be provided for transporting voice, data and control traffic, and each secure logical connection may implement one or more levels of quality of service, encapsulation techniques, compression techniques, security measures and other similar functionalities. In some implementations, one or more secure logical connections may be assigned to an individual mobile handset. Secure logical connections may also be shared, for example, two or more secure logical connections may be shared among two or more mobile handsets.

Figure 3:
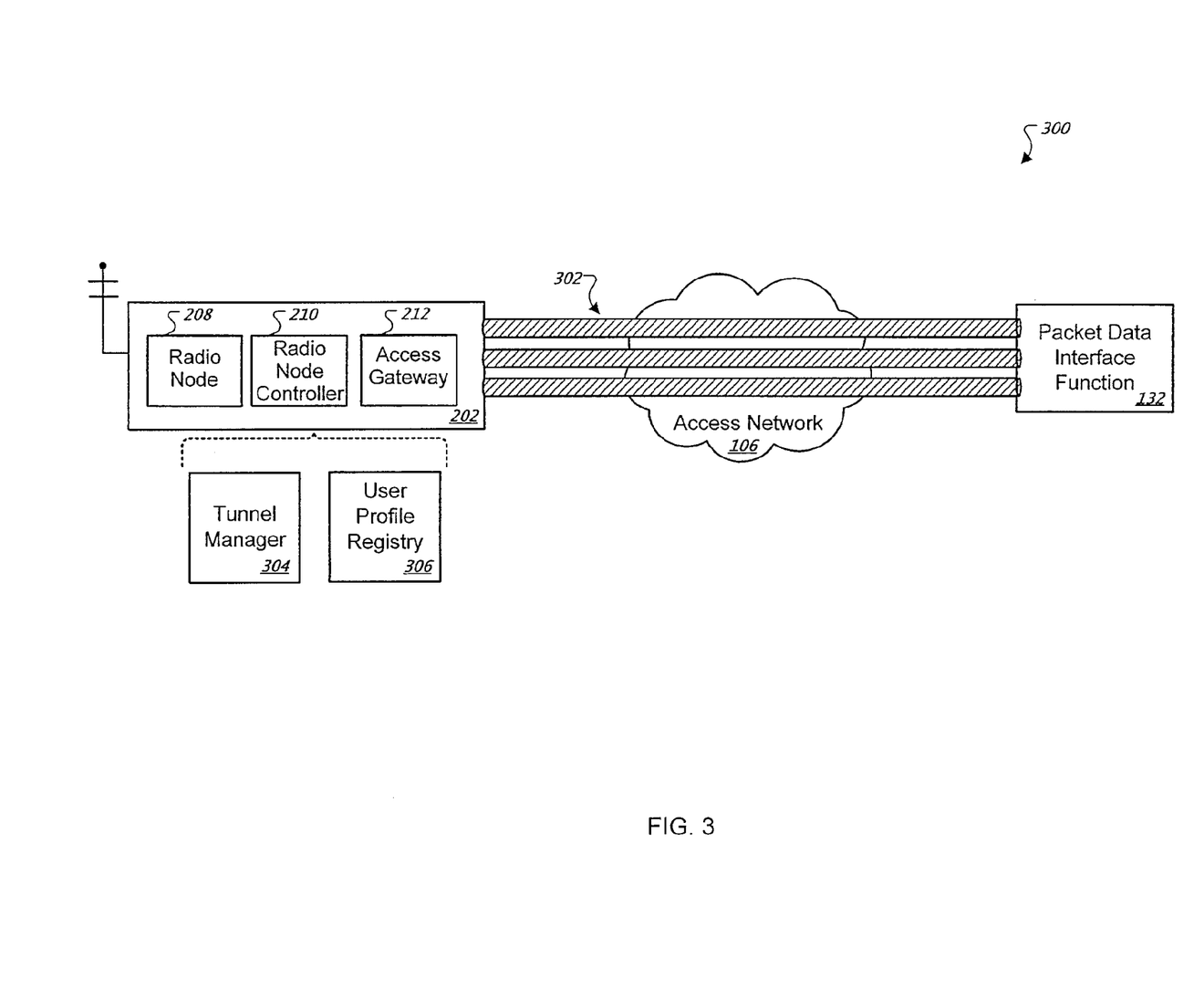
FIG. 3 shows a mobile base station establishing tunnels with a trusted network interface.

Referring to FIG. 3, the mobile base station 202 establishes a set of tunnels 302 that each provide a secure logical connection with the PDIF 132 through the access network 106 to produce a trusted network interface 300. The tunnels 302 may represent dedicated communication channels for voice traffic, data traffic, or control traffic, or combinations of such traffic or similar content. Each of the tunnels 302 may be assigned a priority based upon the traffic to be carried through. For example, the tunnels 302 may provide three logical connections to a single mobile handset in which each connection has a different priority level. By providing such secure connections between the mobile base stations and the PDIF 132, traffic may be bi-directionally transferred in a secure manner through a non-secure network (e.g., access network 106) to and from the secure core network 102.

In some implementations, the tunnels 302 may be established by using one or more protocols, such as the IP Security (IPSec) suite of networking protocols established by the Internet Engineering Task Force (IETF) and herein incorporated by reference. In particular implementations (e.g., tunnel modes) the IPSec protocol suite uses encryption and authentication on a per-packet basis. Each packet of data (e.g., an IP datagram) entering such an IPSec tunnel may be encrypted and authenticated by adding a header (e.g., an Encapsulating Security Payload (ESP) header, an Authentication Header (AH), etc.) and encapsulating the data with a data packet (e.g., an outer IP datagram) for transmission through one or more of the tunnels 302. Upon receipt (e.g., by the PDIF 132), the transmitted data packet may be decrypted using one or more methodologies and techniques (e.g., a cryptographic key, hashing algorithm, etc.) to retrieve the contained data and header information. Along with the IPSec protocol suite, other protocols such as the Layer 2 Tunneling Protocol (L2TP) may be used individually or in combination with one or more of the suite of IPSec protocols for establishing secure logical connections to provide secure access into a secure network through a non-secure network.

One or more methodologies and techniques may be implemented for traversing networks such as private networks to establish secure logical connections with a public core network such as the core network 102. For example, as described in the January 2005 Request for Comments (RFC) 3948, *UDP Encapsulation of IPsec ESP Packets*, by the (IETF) and herein incorporated by reference, secure logical connections may provided by encapsulating packets. For example, IP Encapsulating Security Payload (ESP) packets may be inserted in User Datagram Protocol (UDP) packets (IPSec UDP-encapsulated ESP) for traversing NATs if the mobile base station 202 and a connected mobile handset are located within a VPN using NAT for IP address allocation.

For establishing and managing one or more secure tunnels (or other types of secure logical connections), the mobile base station 202 may include a tunnel manager 304. For example, the tunnel manager 304 may negotiate tunnel allocation with the PDIF 132, initiate tunnel establishment and removal along with providing other operations. In some implementations, upon establishing a session with a mobile handset, the tunnel manager 304 may negotiate to create one or more of the tunnels 302 to transport communications between the mobile handset and the core network 102 (by way of the PDIF 132). Along with determining the number of tunnels to be produced and optionally assigning priorities to one or more of the tunnels, the tunnel manager 304 may dynamically adjust properties (e.g., assigned priority, etc.) of the tunnels 302 and terminate one or more of the tunnels (e.g., upon termination of the mobile handset session).

In some implementations, the tunnel manager 304 may reside in and be executed by the core network 102. For example, the tunnel manager 304 may be included in the PDIF 132 for establishing one or more tunnels (e.g., with the mobile base station 202) to provide traffic to one or more destinations (e.g., a mobile handset). Along with being executed by the mobile base station 202 and the PDIF 132, the tunnel manager 304 may be executed by other devices and components of the network environment 200. For example, a standalone version of the access gateway device 212, a computer system in communication with the mobile base station 202, or other similar component may execute the tunnel manager 304 individually or in a distributed manner for establishing tunnels to securely transport traffic between one or more mobile handsets and the core network 102.

The tunnel manager 304 may initiate production and adjustments to the tunnels 302 based upon capabilities of the network environment 300 components (e.g., mobile handset, base stations, etc.) and network users. For example, traffic prioritization, bandwidth allocation, data security measures and other properties may be implemented based on a per-tunnel and per-user basis. For example, using IP QoS, the tunnel manager 304 may provide tunnels dedicated to different traffic priorities (e.g., high priority for voice traffic and control traffic, low priority for data traffic, etc.). Along with dedicating one or more of the tunnels 302 to a particular traffic type (e.g., voice, data, control, etc.), bandwidth allocations and adjustments may be provided to one or more of the tunnels 302. For example, one or more of the tunnels 302 may be dedicated to control traffic and may be allocated a relatively smaller bandwidth compared to the bandwidth of other tunnels (e.g., dedicated to voice traffic). Subscriptions and other types of service provider techniques may also be used for defining the number of tunnels and tunnel properties that may be made available to one or more users. For example, tunnel allocation, bandwidth allocation, security measures, traffic priority may be determined based upon the services offered to a user (e.g., the user of the mobile handset).

In some implementations, information and data such as service information associated with individual users or groups of users may be stored at the mobile base station 202. Such information may be used to determine services available to a user. For example, the number and type of tunnels that may be allocated to a particular user's mobile handset may be stored at the mobile base station 202. In this arrangement, a user profile registry 306 may store information that identifies users and subscription services (e.g., number of tunnels, priority assignments, etc.) of the respective users and user groups. The user profile may also provide details regarding voice and data services available to the user, traffic priority levels associated with the user, exclusive traffic tunneling services available to the user, etc. The mobile base station 202 includes a user profile registry 306. Each mobile handset connecting to the mobile base station 202 may be associated with a user profile stored in the user profile registry 306. Information stored in the user profile may be provided from one or more sources, for example, one or more mobile handset, networks and network components (e.g., RAN 104) and other similar information sources. In some implementations, the user profile registry 306 may be stored in a memory (not shown) (e.g., random access memory (RAM), read-only memory (ROM), static RAM (SRAM), etc.) or a storage device (also not shown) (e.g., a hard-drive, CD-ROM, etc.)

included in the mobile base station 202 or accessible by the mobile base station (e.g., via the access network 106, the core network 102, the RAN 104, etc.). By accessing and using the information stored in the user profile registry 306, the tunnel manager 304 may perform operations to determine the number and type of tunnels and other tunnel characteristics (e.g., bandwidth, etc) to be allocated to a particular mobile handset based upon a corresponding user profile.

For example, upon connection with a mobile handset, the mobile base station 202 may look up the profile associated with the mobile handset within the user profile registry 306 using identification information provided by the mobile handset (e.g., phone number, personal identification number (PIN), an authentication key, etc.). If a profile can not be identified by the identification information, the tunnel manager 304 may initiate an entry being added to the user profile registry 306. For example, information such as a user profile may be requested from the mobile handset, the core network 102 and other information sources. Upon creating a user profile or if a user profile is identified, the information included in the profile may be used by the tunnel manager 304 for negotiating with the PDIF 132 for an appropriate amount of tunnels when a session with the mobile handset is initiated (e.g., places a call, sends an SMS message, etc.). When the session is terminated (e.g., the mobile handset is disconnected), the tunnel manager 304 may correspondingly terminate the tunnel(s) 302.

In this implementation, the tunnel manager 304 is executed by the mobile base station 202, however, the PDIF 132 or other core network components may execute a tunnel manager. For example, data associated with a voice call may be received by the PDIF 132 to be directed to a mobile handset engaged in an idle connection with the mobile base station 202. By executing a tunnel manager, the PDIF 132 may negotiate to establish one or more tunnels such as the tunnels 302 with the mobile base station 202. Similar to the tunnel manager 304, a tunnel manager executed by the PDIF 132 may access the user profile registry 306 (or another registry located, for example, in the core network 102) to initiate tunnel production and allocation. Along with being executed at a single location such as the mobile base station 202, the PDIF 132, etc., operations of the tunnel manager may be executed in a distributed manner.

In some implementations, tunnels may be established between multiple mobile base stations (e.g., mobile base stations 202, 204, 206 shown in FIG. 2) and one or more PDIFs or other core network 102 components. In this particular arrangement, each of the tunnels 302 are shown traversing the access network 106, however, other types of network components may be traversed individually or in combination with other components. For example, network components (e.g., routers, switches, gateways, etc.) included in the core network or external to the core network may be traversed by one or more of the tunnels 302.

Figure 4:
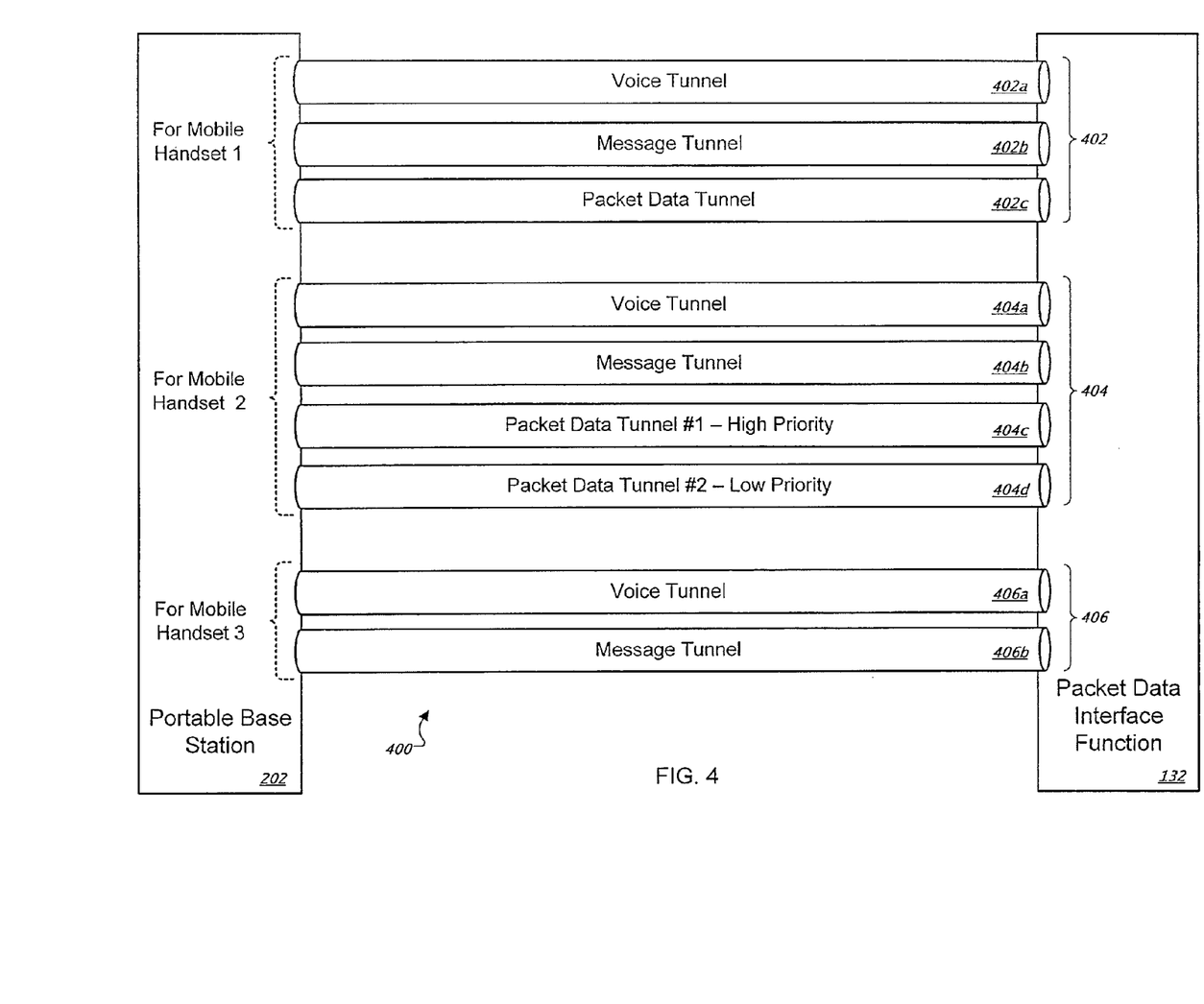
FIGS. 4 and 5 show types of tunnels established between a mobile base station and a trusted network interface.

Referring to FIG. 4, multiple types of tunnels may be established between the mobile base station 202 and the PDIF 132 (on behalf of multiple mobile handsets) to form a trusted network environment 400. In this illustration, a first mobile handset is allocated a first set of tunnels 402 that include a voice tunnel 402a, a message tunnel 402b, and a packet data tunnel 402c. In some implementations, characteristics and parameters associated with one or more of the tunnels 402 e.g., bandwidth, priority, quality of service, security measures, etc.) may be set (e.g., optimized) for a particular type of traffic. For example, the quality of service for the voice tunnel 402a may be set for a relatively high level to ensure call clarity, while the packet data tunnel 402c may be allocated a large bandwidth for faster information downloading functionality. The message tunnel 402b may be allocated a relatively smaller bandwidth, for example, to transport Short Message Service (SMS) traffic.

Priority levels may also be assigned to one or more tunnels, for example, a second mobile handset may be allocated a group of tunnels 404 that includes a voice tunnel 404a, a message tunnel 404b, a high priority packet data tunnel 404c, and a low priority packet data tunnel 404d. Content subject to one or more constraints (e.g., transfer time, presentation time, etc) will be transported over a tunnel with an appropriate priority. For example, streaming video traffic may be transported through the high priority packet data tunnel 404c to ensure the quality of audio and image, while large file downloads (e.g., photo sharing) may be transported through the lower priority packet data tunnel 404d.

Tunnel assignments may also depend upon services selected by an end user, such as by purchasing a subscription for an allocation of tunnels. For example, a third mobile handset may be allocated a group of tunnels 406 that only includes a voice tunnel 406a and a message tunnel 406b. Such tunnels may provide a mobile handset such as a cellular telephone with voice and text messaging capabilities. By requesting additional services (e.g., purchasing another subscription), other types of tunnels may be assigned (e.g., a packet data tunnel) or additional tunnels (e.g., a second message tunnel) may be allocated. In other implementations, the tunnels 406 may have been allocated because the third mobile handset may presently be actively engaged in both voice and message communications.

In some implementations, multiple tunnels may be grouped together. A group of tunnels may be associated together based on user subscription information. A group of tunnels may share similar characteristics, parameters or functionalities and may transmit one or more types of content.

In some implementations, multiple mobile handsets may be allocated one or more tunnels that extend to the PDIF 132 through the mobile base station 202. The tunnel configuration associated with a single mobile handset, in some implementations, may change during a session. For example, if the user of the second mobile handset is engaged on a SIP phone call while browsing the Internet, the voice tunnel 404a may close when the voice call is disconnected while the packet data tunnels 404c, 404d remain for transferring data to a browser application. In some implementations, a single tunnel may be shared by multiple mobile handsets.

Figure 5:
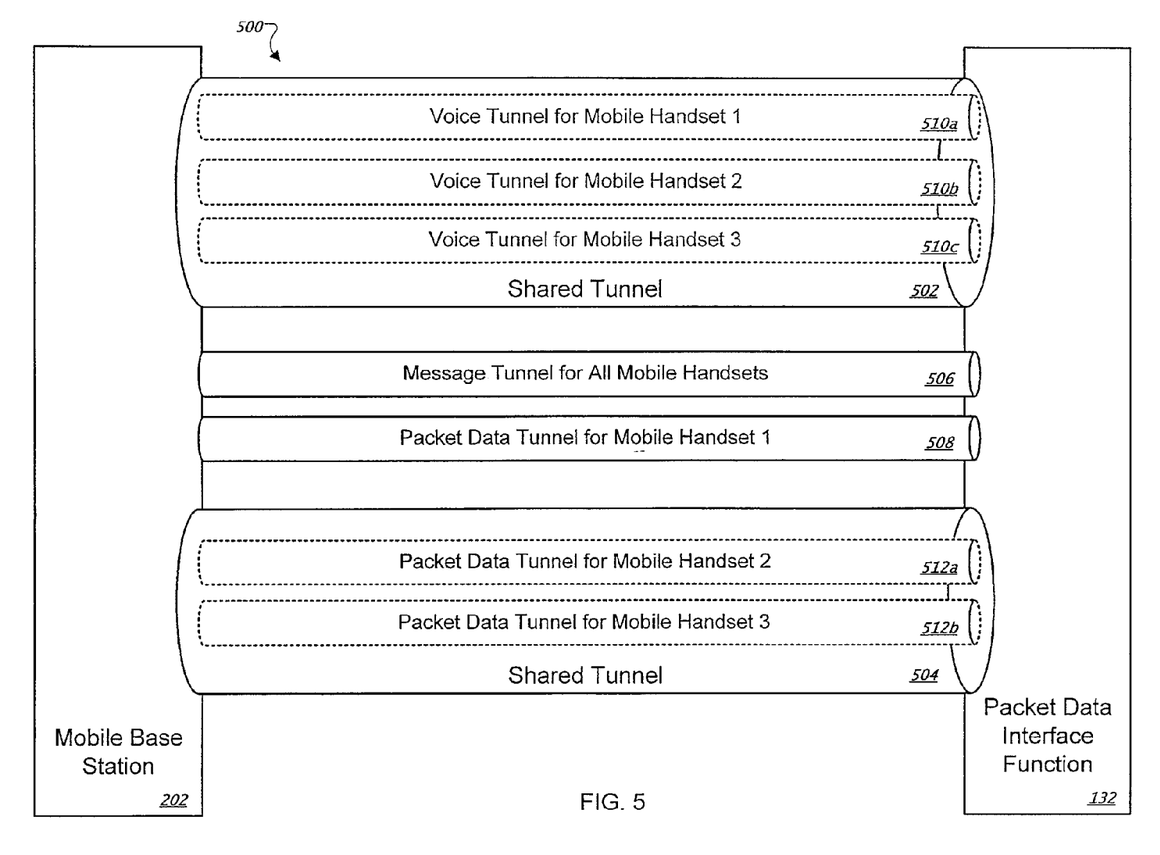

Referring to FIG. 5, a shared voice tunnel 502, a shared packet data tunnel 504, and a shared message tunnel 506 are established between the mobile base station 202 and the PDIF 132 to form a trusted network environment 500. The shared tunnels 502, 504, 506 may each transport traffic for multiple mobile handsets or a single handset. In some implementations, the traffic for individual mobile handsets may be multiplexed within a single shared tunnel. For example, the IPSec security measures may be used with the shared message tunnel 506 independently or in combination with the individual traffic streams from each mobile handset. In some implementations, multiplexing or other similar techniques may be used to combine tunnels to form a shared tunnel. For example, one or more IPSec security measures (e.g., encryption, authentication) may be individually applied to three tunnels 510a, 510b, 510c which may be combined (e.g., multiplexed) to form the shared tunnel 502 (e.g., IPSec tunnel, L2TP tunnel, etc.) and allocated to one or more mobile handsets.

In some implementations, a shared tunnel may include individual tunnels for transporting similar or different types of traffic. For example, the shared voice tunnel 502 may multiplex the voice tunnels 510 associated with one or more mobile handsets. Each of the tunnels included in the shared voice tunnel 502 may have similar or different characteristics and operational parameters. For example, the tunnels 510a-c may have similar characteristics (e.g., bandwidth, priority, quality of service, etc.) or different characteristics based upon the traffic to be transmitted over the channels (e.g., voice, message, packet data, etc.). In some implementations, each tunnel of a shared tunnel may be optimized for a particular mobile handset. For example, within the shared packet data tunnel 504, a packet data tunnel 512a associated with one mobile handset may be allocated a larger bandwidth and/or a higher traffic priority than a packet data tunnel 512b associated with another mobile handset. In some implementations, the shared tunnels 502, 504 may be readjusted (e.g., bandwidth reallocated) depending upon the number of mobile handsets engaged in active sessions with the mobile base station 202. For example, the bandwidth of the shared voice tunnel 502 may be reduced if one mobile handset ends a voice session (e.g., voice tunnel 510a is terminated.)

Individual tunnels may also be established and used in conjunction with shared tunnels. For example, a packet data tunnel 508 may be individually allocated to one mobile handset (e.g., a handset 1) that is also using one or more tunnels included in a shared tunnel (e.g., voice tunnel 510a). Individual tunnels may also be shared by one or more mobile handsets. For example, in this arrangement, a single message tunnel 506 may be used to provide messages to each mobile handset associated with the mobile base station 202. In one example, the user profile associated with the first mobile handset may designate a higher quality of service for packet data than may be provided within the shared packet data tunnel 504. In such a case, a single packet data tunnel with a higher quality of service may be provided to the first mobile handset. In another example, when a third mobile handset tries to establish an active session with the mobile base station 202, the mobile base station 202 and/or the PDIF 132 may have been incapable of allocating an additional tunnel to the third mobile handset (e.g., tunnel resources at capacity). In this example, the packet data of the third mobile handset may instead share the packet data tunnel 512a with the data of the second mobile handset, utilizing fewer tunneling resources at both the mobile base station 202 and the PDIF 132.

Figure 6:
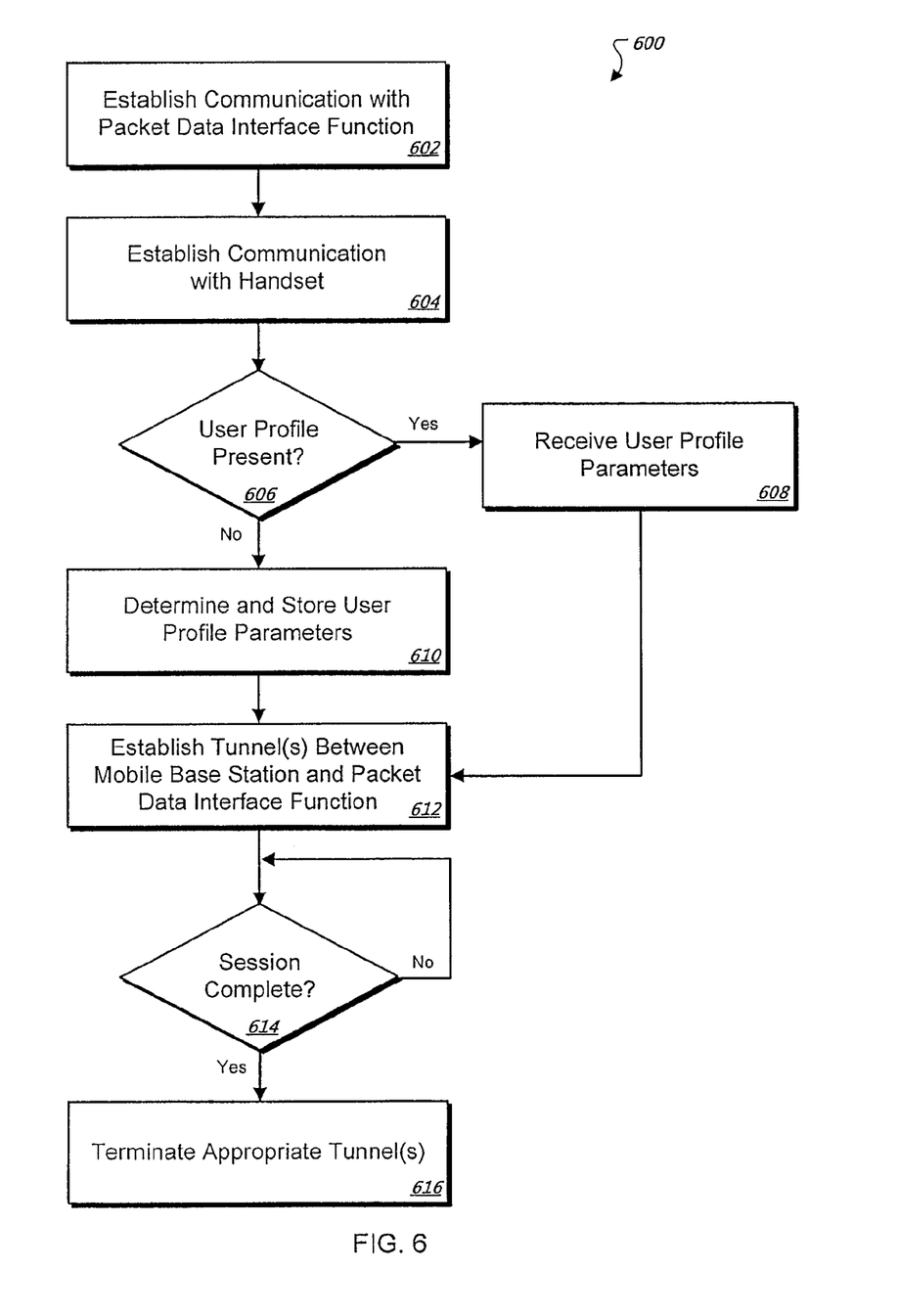
FIG. 6 is a flow chart of some operations of a tunnel manager.

Referring to FIG. 6, a flow chart 600 represents operations of the tunnel manager 304 (shown in FIG. 3) for establishing one or more tunnels between a mobile base station (e.g., mobile base station 202) and a PDIF (e.g., PDIF 132 shown in FIG. 1) for providing traffic of one or more mobile handsets (e.g., mobile handset 112a shown in FIG. 1) into a core IP network (e.g., core network 102) in a secure manner. Unlike radio access networks in which the network communications equipment and access to them are tightly controlled by telecommunications service providers, access to an IP network is loosely controlled by individual service providers using a myriad of access methods (e.g., access network 106 shown in FIG. 1). In order to ensure the security of traffic entering into the IP network, authentication and/or encryption means may be established between the sender (e.g., the mobile base station) and the gateway of the IP network (e.g., a PDIF). As such, operations of the tunnel manager 304 may include establishing 602 communications with the PDIF, for example, obtaining authorization to traverse an intermediary access network (e.g., access network 106).

Operations may also include establishing 604 communications with a mobile handset. In some implementations, a mobile base station may broadcast its eligibility as a connection point for mobile handsets communicating in one or more protocols (e.g., GSM, CDMA, TDMA, SIP, etc.). A mobile handset may connect to the mobile base station to gain access to voice and/or data communications provided by the service provider associated with the mobile handset. A mobile handset may be associated with a user profile within the service provider network. The user profile may include information regarding the services available to the mobile handset, account and billing information associated with the mobile handset, service provider authentication information for the mobile handset, etc.

Once a mobile handset has connected to the mobile base station, operations may include determining 606 if a user profile associated with the mobile handset has been stored by the mobile base station (e.g., within the user profile registry 306). If a user profile is present, operations of the tunnel manager may include receiving 608 one or more appropriate user profile parameters. If absent, operations may include determining 610 the appropriate user profile parameters and storing the parameters (e.g., within the user profile registry 306 shown in FIG. 3) for later retrieval. In some implementations, the tunnel manager 304 may request the user profile from the service provider. For example, the tunnel manager 304 may receive identification information from the mobile handset for providing to a service provider to retrieve the user profile. The user profile, in some implementations, may be provided by the mobile handset.

User profile information, in some implementations, may provide the mobile base station 202 and the tunnel manager 304 with guidelines regarding the traffic capabilities of the mobile handset. For example, user profile parameters may provide the type of content the mobile handset may be capable of sending and receiving (e.g., voice, data, video, etc.), the bandwidth that may be allocated to the mobile handset (e.g., total bandwidth or bandwidth per traffic type), the quality of service and priority level to attribute to traffic associated with the mobile handset, etc. The user profile parameters, may also provide the mobile base station the level of security to be provided to the traffic associated with the mobile handset.

In order for traffic to be communicated between the mobile handset and a component of a core network, operations of the tunnel manager 304 may include establishing 612 one or more logical data tunnels between the mobile base station and a PDIF. In some implementations, tunnels may be allocated based, in part, upon the information included in the user profile parameters. For example, a tunnel bandwidth, quality of service level, priority level, security level, etc. may be based upon user profile parameters. In some implementations, instead of establishing a new tunnel, a previously existing tunnel may be shared with one or more other mobile handsets. In some implementations, a tunnel may be established when the connection between the mobile handset and the mobile base station moves from an idle state to an active state. In some implementations, the tunnel traffic may be encrypted and/or authenticated. For example, the tunnel(s) may be established using the IPSec protocol suite in tunnel mode.

The operations also include determining 614 when session between the mobile handset and the core network has completed. For example, the tunnel manager 304 may monitor for the termination of a voice call between the mobile handset (e.g., a cellular telephone) and a device (e.g., another cellular telephone) connected to the core network 102. Once the active session has ended (e.g., the voice call has been disconnected), the operations of the tunnel manager 304 may include terminating 616 the tunnels associated with the session. If the mobile handset was allocated a portion of a shared tunnel, in some implementations, the mobile base station may resize the bandwidth of the shared tunnel or otherwise terminate the association of the mobile handset with that tunnel without terminating the tunnel. In some implementations, one or more tunnels may continue to be allocated to the mobile handset. For example, even though a voice session may have terminated, a data transfer session may still be in progress with the same mobile handset. The tunnel(s) associated with the data transfer session, in this example, may remain intact while the voice tunnel may be terminated.

Advantages include the following. Configuration of authorized private access points on handsets without end-user intervention is enabled through both push and pull processes (e.g., using OTAP protocols, IOTOA protocols, etc.). Fast switchover from a macro access point to a private access point without user intervention is possible. A private access point can be searched for efficiently, preserving handset battery life. Unnecessary switchover from a macro access point to a private access point is avoided as access terminals do not need to perform Location/Update or SectorID decoding to identify their own private access point. No modifications are required to the software and configuration of the macro network. Handset chipset makers are not required to expose internal APIs to application vendors, because the existing PUZL system accommodates the geographic location information. New applications are not required to be bundled with handsets. Dynamic addition and removal of subscribers to and from a list of private access points are enabled, as the private access points report their location when powered up. Private access points can be moved around without intervention by users of access terminals.

Although the techniques described above employ the 1xEV-DO air interface standard, the techniques are also applicable to other CDMA and non-CDMA air interface technologies in which an access terminal communicates with a server over a wireless network.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims. The techniques described herein can be performed in a different order and still achieve desirable results.

What is claimed is:
1. A method comprising:
establishing, through a non-secure network, at least one bidirectional secure logical connection between a mobile base station and a secure network interface,
wherein the at least one bidirectional secure logical connection is assigned a priority, the mobile base station includes a tunnel manager capable of initiating, terminating and managing the at least one bidirectional secure logical connection, the mobile base station maintains a user profile registry in which respective user profiles containing user profile parameters of each user are stored and from which the tunnel manager retrieves the user profile of a user to determine the properties for establishing the at least one bidirectional secure logical connection for that user.

2. The method of claim 1, in which the at least one bidirectional secure logical connection is established based on user profile parameters.

3. The method of claim 1, in which the at least one bidirectional secure logical connection is configured to transfer one or more types of content.

4. The method of claim 1, in which the at least one bidirectional secure logical connection is assigned to a mobile handset connected to the mobile base station.

5. The method of claim 1, in which the at least one bidirectional secure logical connection is assigned to two or more mobile handsets connected to the mobile base station.

6. The method of claim 1, in which the at least one bidirectional secure logical connection is grouped with another bidirectional secure logical connection based on user profile parameters.

7. The method of claim 6, in which the group of bidirectional secure logical connections is assigned a priority.

8. The method of claim 1, in which the at least one bidirectional secure logical connection is assigned a first priority and another bidirectional secure logical connection is assigned a second priority, different from the first priority.

9. The method of claim 1, in which the at least one bidirectional secure logical connection is established using IPSec protocol.

10. An apparatus comprising:
a mobile base station capable of establishing, through a non-secure network, at least one bidirectional secure logical connection with a secure network interface,
wherein the at least one bidirectional secure logical connection is assigned a priority, the mobile base station includes a tunnel manager capable of initiating, terminating and managing the at least one bidirectional secure logical connection, the mobile base station maintains a user profile registry in which respective user profiles containing user profile parameters of each user are stored and from which the tunnel manager retrieves the user profile of a user to determine the properties for establishing the at least one bidirectional secure logical connection for that user.

11. The apparatus of claim 10, in which the tunnel manager assigns the at least one bidirectional secure logical connection to a mobile handset connected to the mobile base station.

12. The apparatus of claim 10, in which the tunnel manager assigns the at least one bidirectional secure logical connection to two or more mobile handsets connected to the mobile base station.

13. A system comprising:
a secure network that includes a secure network interface; and
at least one mobile base station capable of establishing, through a non-secure network, at least one bidirectional secure logical connection with the secure network interface,
wherein the at least one bidirectional secure logical connection is assigned a priority, the mobile base station includes a tunnel manager capable of initiating, terminating and managing the at least one bidirectional secure logical connection, the mobile base station maintains a user profile registry in which respective user profiles containing user profile parameters of each user are stored and from which the tunnel manager retrieves the user profile of a user to determine the properties for establishing the at least one bidirectional secure logical connection for that user.

14. The system of claim 13, further comprising one or more mobile handsets in communication with the at least one mobile base station.

15. A computer readable medium storing instructions that are executable by a processing device, and upon such execution causing the processing device to:
establish at least one bidirectional secure logical connection between a mobile base station and a secure network interface via a non-secure network,
wherein the at least one bidirectional secure logical connection is assigned a priority, the mobile base station includes a tunnel manager capable of initiating, terminating and managing the at least one bidirectional secure logical connection, the mobile base station maintains a user profile registry in which respective user profiles containing user profile parameters of each user are stored and from which the tunnel manager retrieves the user profile of a user to determine the properties for establishing the at least one bidirectional secure logical connection for that user.

16. The medium of claim 15, in which the establishment of the at least one bidirectional secure logical connection is based on user profile parameters.

17. The medium of claim 15, in which the at least one bidirectional secure logical connection is grouped with another bidirectional secure logical connection based on user profile parameters.

* * * * *